E. E. GRAY.
TRANSMISSION MECHANISM.
APPLICATION FILED MAR. 21, 1912. RENEWED JULY 26, 1920.
1,371,238.
Patented Mar. 15, 1921.
8 SHEETS—SHEET 1.
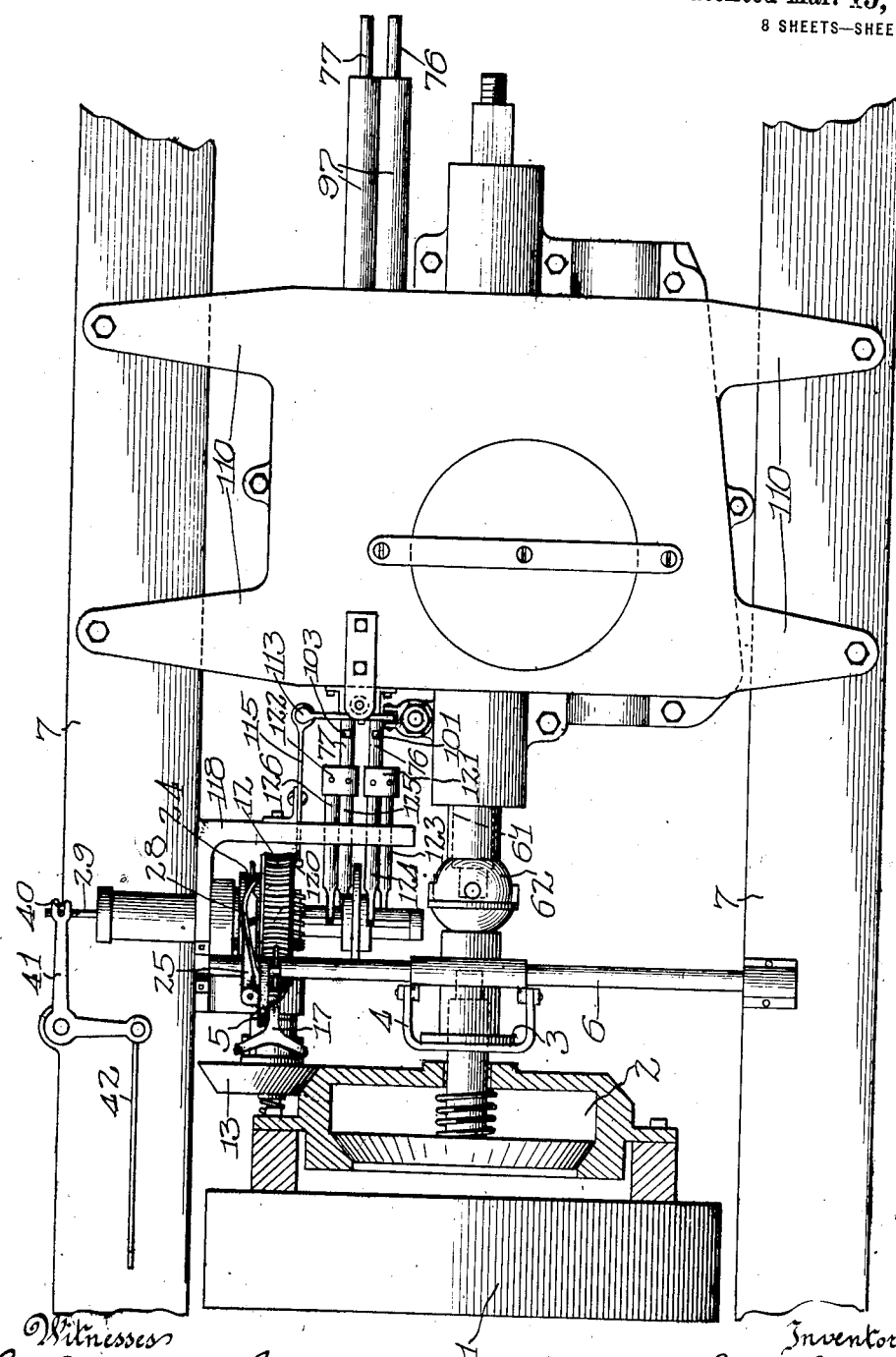

E. E. GRAY.
TRANSMISSION MECHANISM.
APPLICATION FILED MAR. 21, 1912. RENEWED JULY 26, 1920.
1,371,238.
Patented Mar. 15, 1921.
8 SHEETS—SHEET 2.
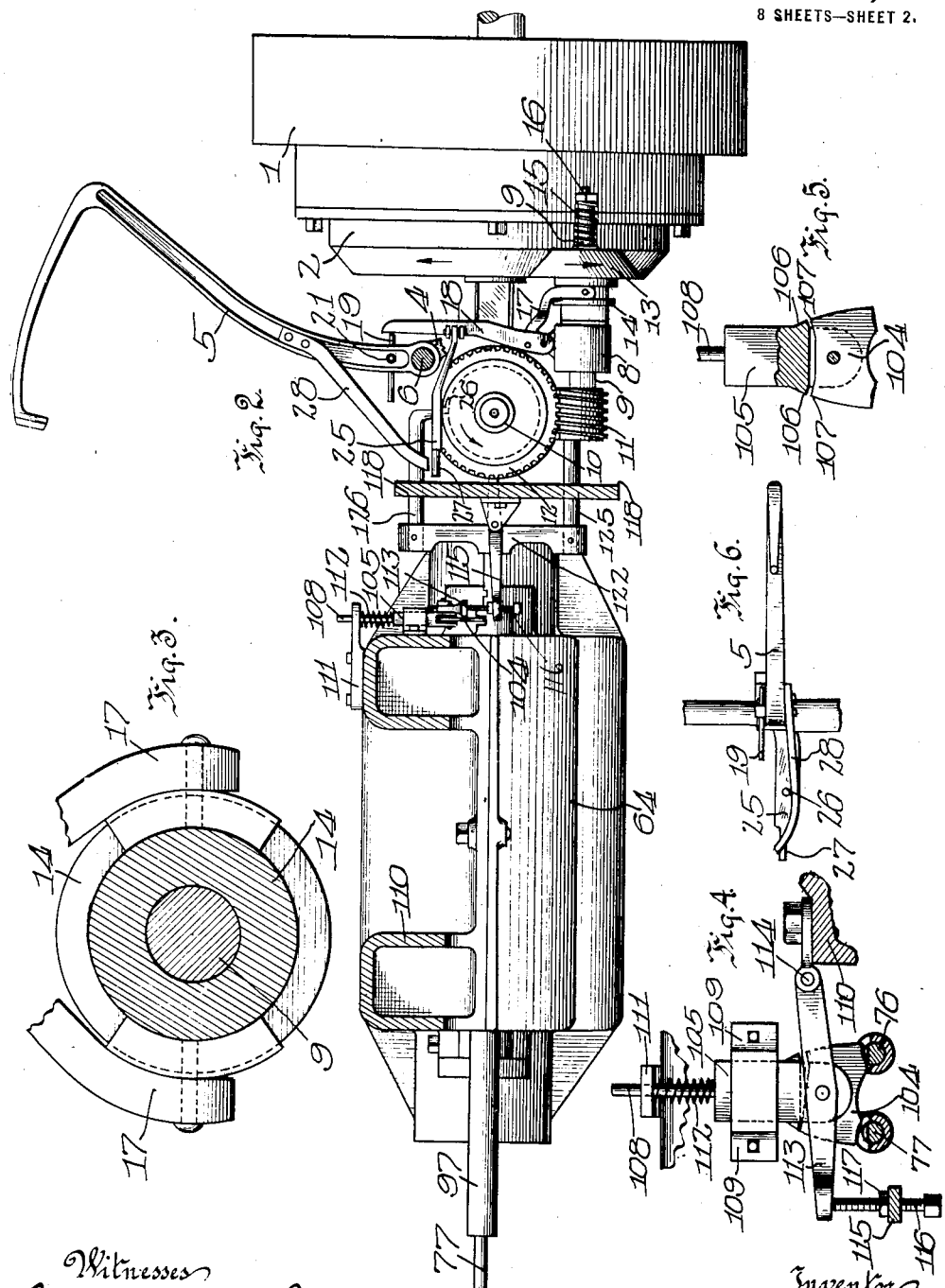

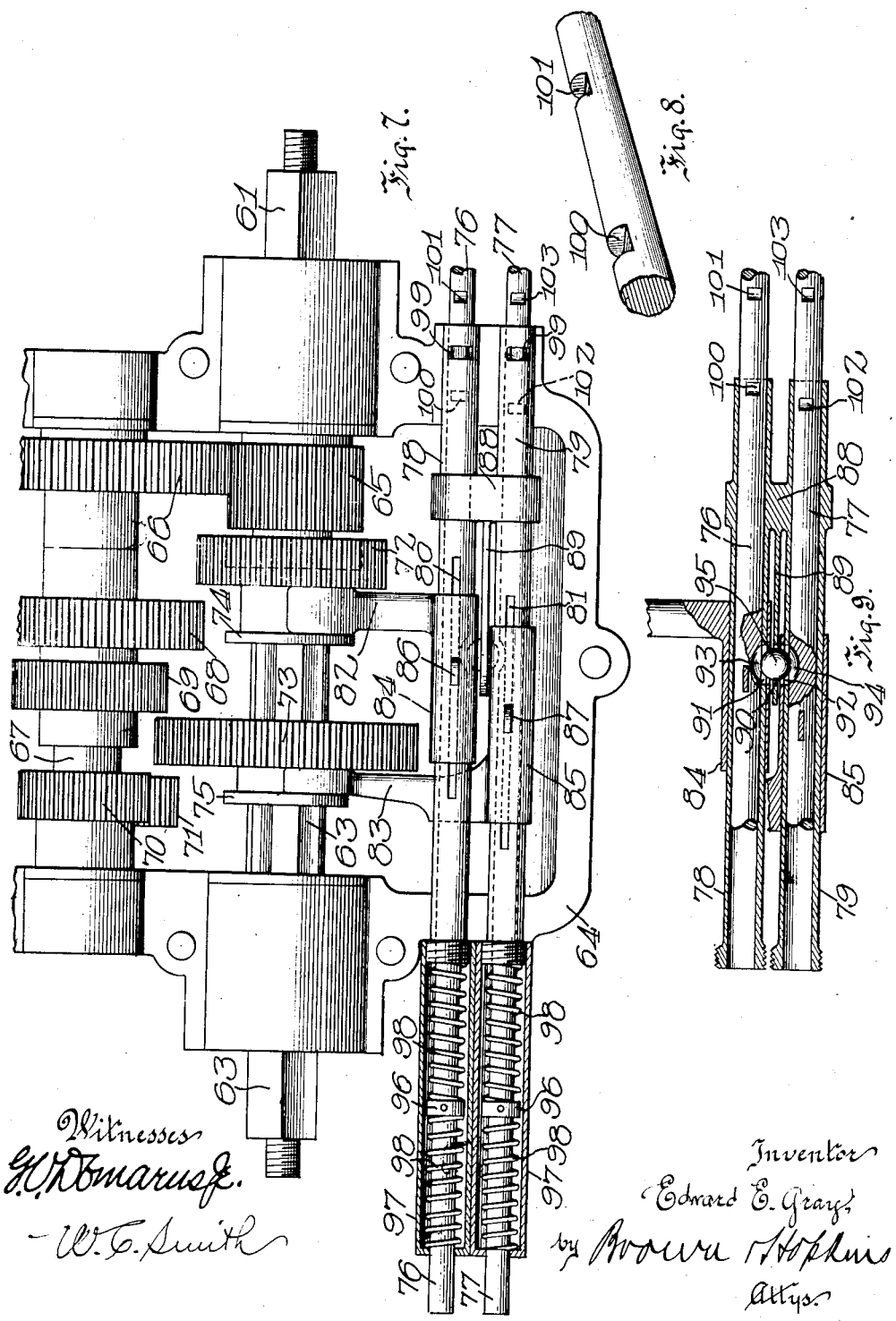

E. E. GRAY.
TRANSMISSION MECHANISM.
APPLICATION FILED MAR. 21, 1912. RENEWED JULY 26, 1920.
1,371,238.
Patented Mar. 15, 1921.
8 SHEETS—SHEET 4.
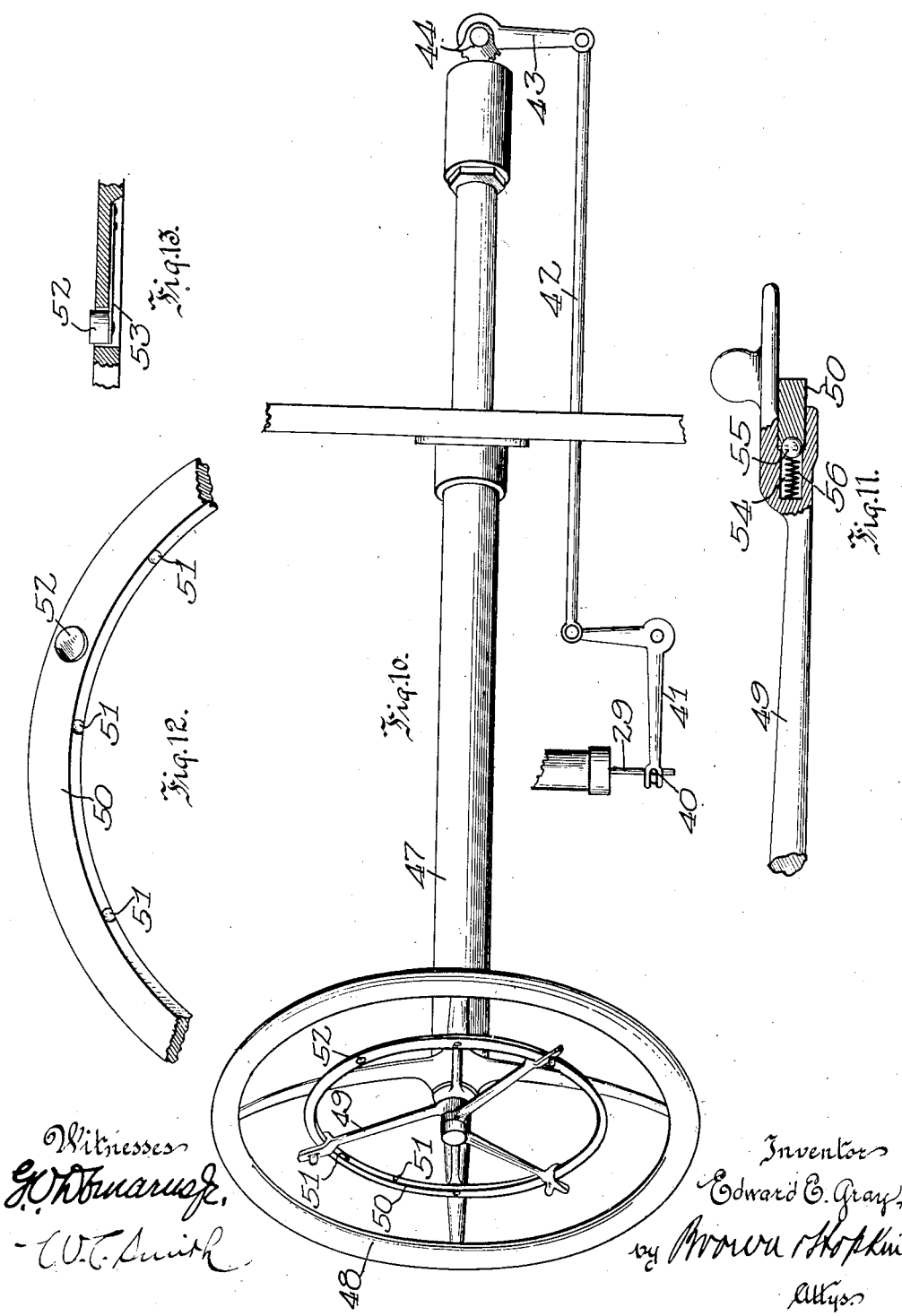

E. E. GRAY.
TRANSMISSION MECHANISM.
APPLICATION FILED MAR. 21, 1912. RENEWED JULY 26, 1920.
1,371,238.
Patented Mar. 15, 1921.
8 SHEETS—SHEET 5.
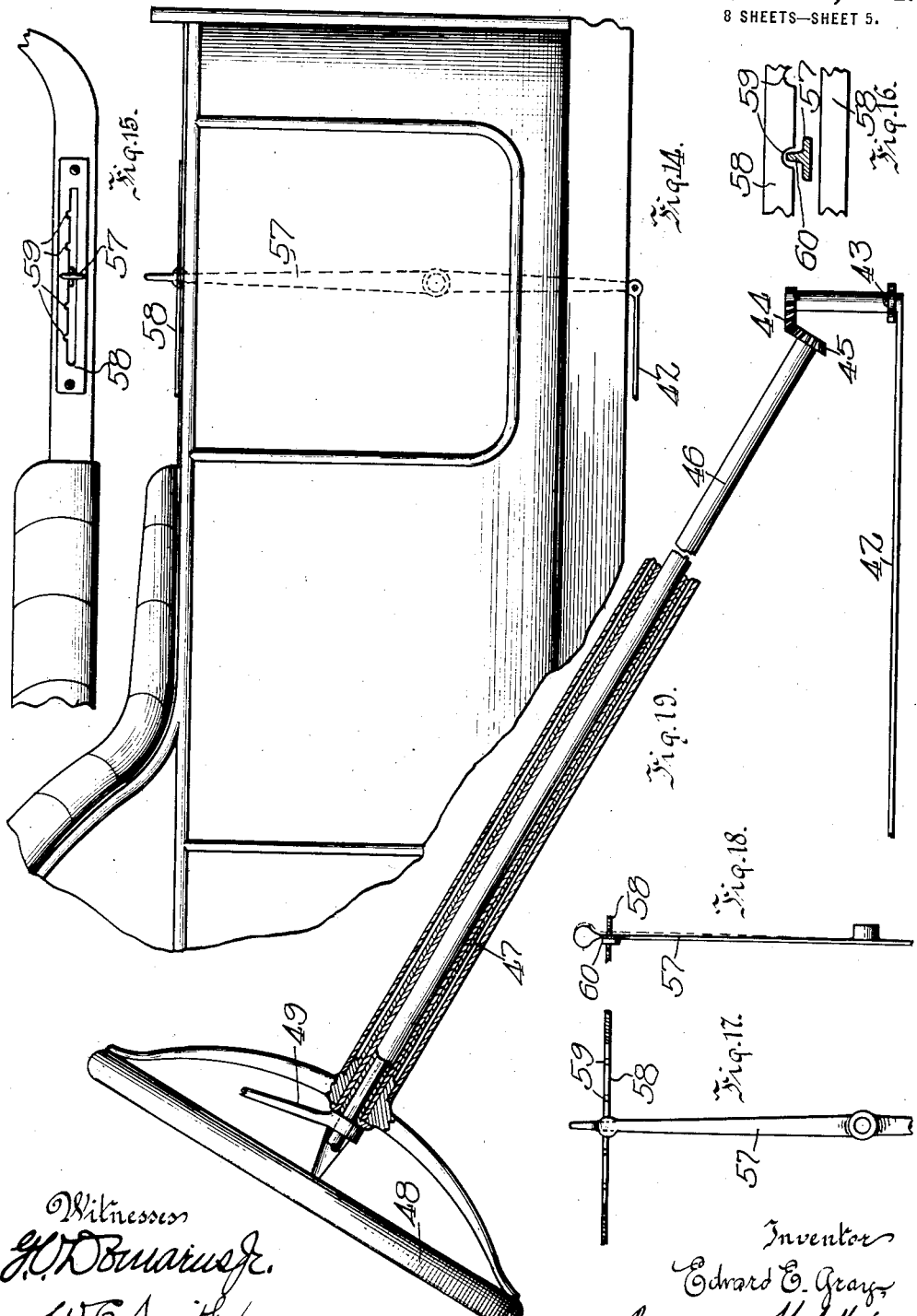

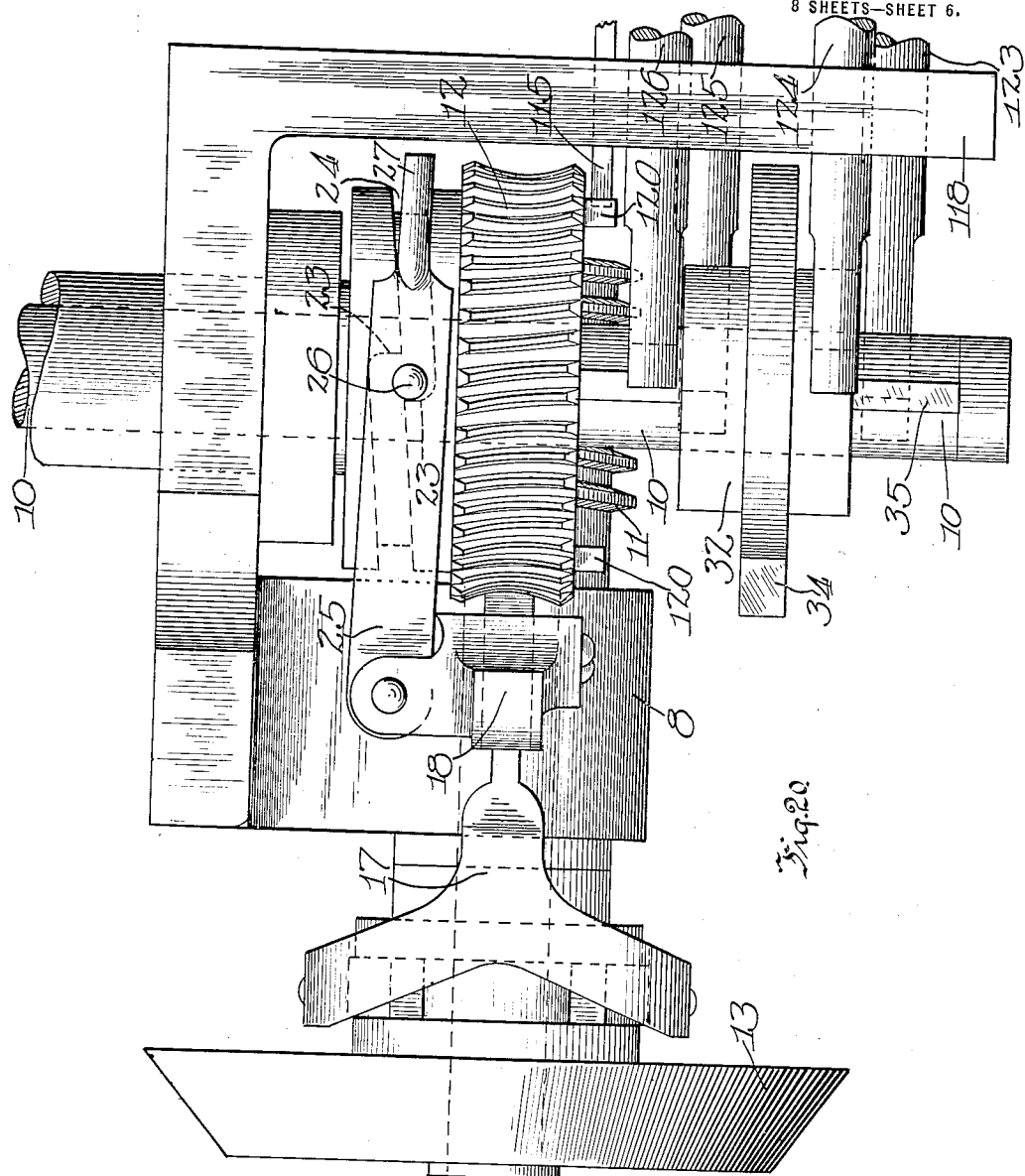

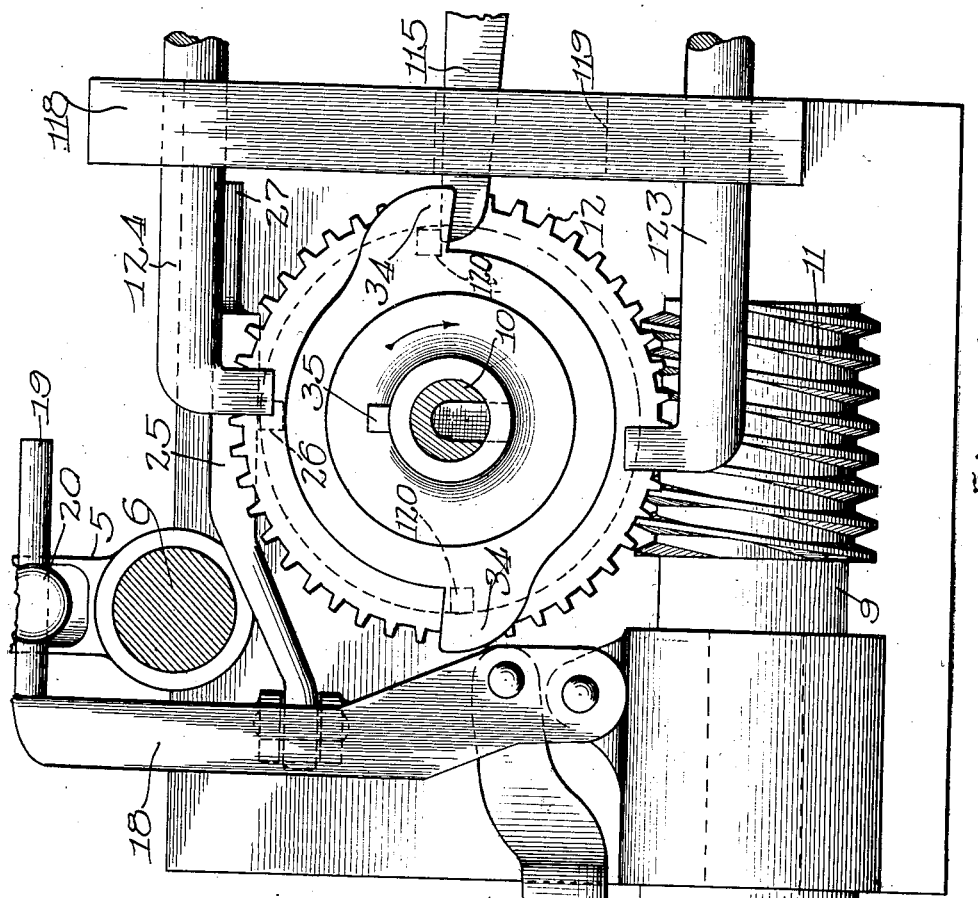
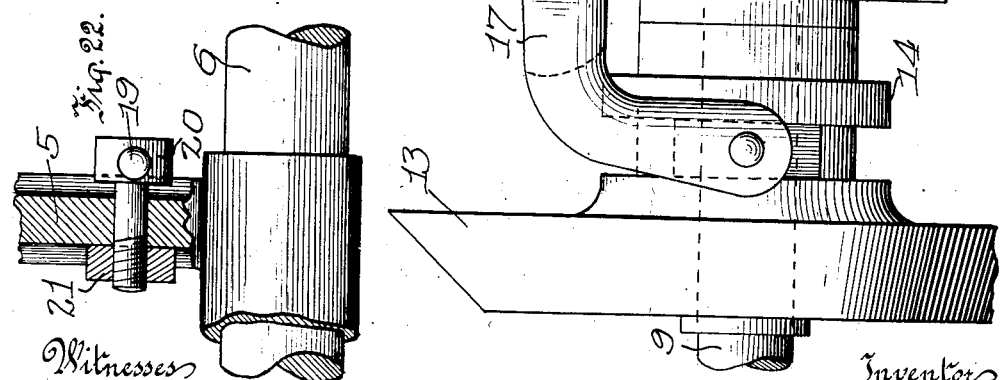

E. E. GRAY.
TRANSMISSION MECHANISM.
APPLICATION FILED MAR. 21, 1912. RENEWED JULY 26, 1920.
1,371,238.
Patented Mar. 15, 1921.
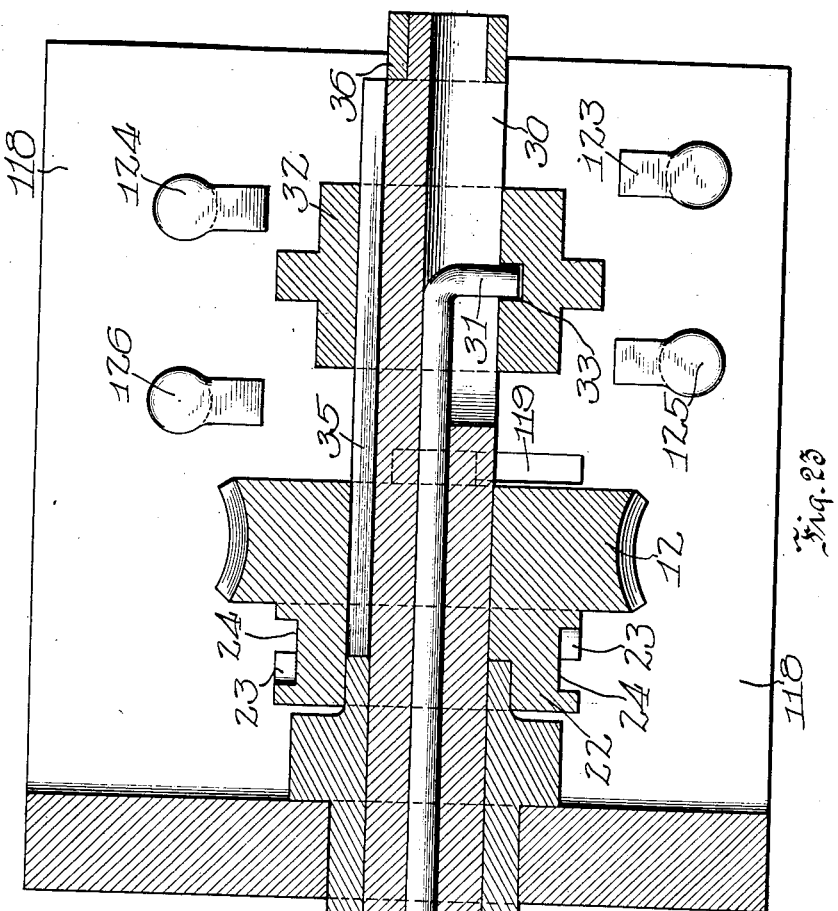
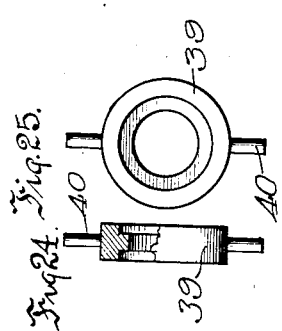
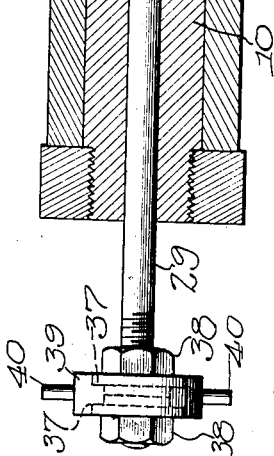

UNITED STATES PATENT OFFICE.

EDWARD E. GRAY, OF PLANO, ILLINOIS, ASSIGNOR, BY MESNE ASSIGNMENTS, TO AUTOMATIC GEAR SHIFT COMPANY, A CORPORATION OF ILLINOIS.

TRANSMISSION MECHANISM.

1,371,238.  Specification of Letters Patent.  Patented Mar. 15, 1921.

Application filed March 21, 1912, Serial No. 685,336. Renewed July 26, 1920. Serial No. 399,180.

*To all whom it may concern:*

Be it known that I, EDWARD E. GRAY, a citizen of the United States, residing at Plano, and State of Illinois, have invented certain new and useful Improvements in Transmission Mechanism, of which the following is a specification.

This invention relates to the operation and control of power transmitting mechanism, and may be particularly described as means for effecting the gear shifting operation in a transmission mechanism, by the application of power from the driving mechanism. The principal object of the invention is to provide a mechanism of this class which is effective and efficient in operation.

More particularly the object of the invention is to provide means for the operation and control of the gear shifting mechanism of a self propelled vehicle, whereby the motive agency of the vehicle may be utilized in shifting the transmission gears into their various and previously selected driving connections.

Another object of the invention is to provide mechanism of improved construction, which shall obviate the necessity for gear shifting levers.

A further object is to provide means to prevent the reversal of the mechanism from either direction of rotation without the attention of the operator.

For the attainment of these ends, and the accomplishment of other new and useful objects, as will appear, the invention consists in the features of novelty in the construction, combination and arrangement of the several parts generally shown in the accompanying drawings and described in the specification, but more particularly pointed out in the appended claims.

In the drawings Figure 1 is a plan view of the preferred embodiment of mechanism of the class described as applied to a power transmitting mechanism, such, for example, as employed in an automobile; Fig. 2 is a side elevation partly in section of the apparatus shown in Fig. 1; Fig. 3 is a detail view of a clutch collar and yoke; Fig. 4 is a detail view of a locking device for the gear shifting bars; Fig. 5 is a detail view of the locking latch shown in Fig. 4; Fig. 6 is a plan view in detail of a portion of the mechanism shown in Fig. 2; Fig. 7 is a plan view of the power transmitting gears with the upper portion of the transmission case removed with parts being shown in section for clearness; Fig. 8 is a detail perspective view showing the locking notches in one of the gear shifting bars; Fig. 9 is a detail sectional view showing the locking device for preventing the operation of both of the gear shifting bars at the same time; Fig. 10 is a view of a steering post and wheel to which a selecting mechanism of the construction preferred in the present invention is applied; Fig. 11 is a detail view of a positioning device for the selecting arm; Fig. 12 is a view of a portion of the indicating ring segment showing the position of a stop device; Fig. 13 is a detail sectional view of such a stop device; Fig. 14 is a view in section of the side panel of an automobile in which an indicating lever, shown in dotted outline, for operating the selective device, is positioned; Fig. 15 is a plan view of the detail shown by Fig. 14; Fig. 16 is a detail view showing the means for retaining the selecting lever in any one of a number of selected positions; Figs. 17 and 18 are detail views of the lever shown in dotted outline in Fig. 14; Fig. 19 is a detail sectional view of a steering post and wheel to which the preferred form of a selecting device is applied; Fig. 20 is a detail plan view of the mechanism which is applied to the motor or other source of power to effect the operation of the gear shifting bars; Fig. 21 is a side elevation of the mechanism in Fig. 20; Fig. 22 is a detail view of an adjustable engaging pin; Fig. 23 is a sectional view in elevation of the gear selecting shaft and mechanism; Fig. 24 is a view partly in section of a ring for permitting the rotation of the gear selecting rod; Fig. 25 is a plan view of the same; Fig. 26 is a view of a disk for the ring; and Fig. 27 is a plan view of the disk.

Although the present invention is designed to be employed in any connection where it is necessary to change the speed of a driving member by means of various transmission gears, it is preferably adapted, and the present embodiment of the application is particularly explained, as being employed in connection with an automobile. The objections to the employment of levers at the side of the car for shifting the gears are many, and the present invention is for the purpose of obviating some of these difficulties. It is also the purpose of the present invention to provide means whereby the driving motor or power obtained from the driving motor may be employed to effect the gear shifting operation of the transmission gears so that it will be necessary for an operator of the machine only to select the gear which he desires to place in driving engagement by a comparatively simple operation, and then to utilize the power obtained from the driving motor to effect the shifting of the selected gear into the proper driving connection. In accomplishing these results many features of construction and operation are employed which render the mechanism safe and easily operable and which render it effective and efficient in operation.

Referring more particularly to the drawings, and in the present exemplification of the invention, the numeral 1 will be used to designate a rotary element of the source of power, such, for example, as the fly wheel, or any desired or suitable type of motor or engine, the direction of motion being indicated by the arrow in Fig. 2, and the numeral 2 will be used to designate a clutch, which may also be of any desired or suitable construction and which has the tendency to be pressed normally into engaging position with the driving member 1 by means of an internal spring, in accordance with the well known practice in this art.

The clutch is provided with a collar 3, which is engaged by a yoke member 4 and operated by means of a foot lever 5, rotatable with the transversely extending shaft 6, to which the yoke is connected, the tendency of the clutch spring being to draw the yoke 4 toward it and to draw the foot lever 5 (see Fig. 2) in its uppermost position. In Fig. 2, however, the clutch lever 5 is in what may be termed the neutral position, in which position it must be held by pressure.

In the present exemplification of the invention, the shaft 6 is suitably mounted in the slotted frame 7 of the vehicle and a bearing member 8 is suitably held by one of the frames in which a longitudinally extending shaft 9 is rotatably mounted. A second shaft 10, which will be referred to hereafter as the selector shaft, is preferably mounted in one of the frames 7, substantially at right angles to the shaft 9, the latter being provided with a worm 11 and the shaft 10 with a gear 12, meshing with the worm by means of which motion is communicated from the shaft 9 to the shaft 10. At the other end of the shaft 9 a friction pulley 13 is secured, which is adapted to engage a suitable rotating surface of the rotating member 1 or of the outer clutch member 1 attached thereto, so that motion may be communicated from the power member to the shaft 9. This pulley 13 is longitudinally movable with respect to the shaft 9, and is preferably provided with a collar 14, by means of which the pulley may be moved upon the shaft. The shaft 9 preferably extends beyond the pulley 13 at the side of the clutch member 2, and is provided at its outer end with a spring 15, the tension of which may be adjusted by means of a nut 16 and which bears resiliently against the pulley 13, so that the pulley may be moved into engagement with the rotating power element, the tendency of the spring, however, being to force it out of engagement with the said member. To effect the movement of the pulley a bifurcated yoke 17 is provided to engage the collar (see also Fig. 3), and the yoke 17 is pivotally secured to a lever 18, which is pivotally mounted at its lower end adjacent the bearing 8 of a shaft 9 and extends upwardly in proximity to the foot lever 5, preferably slightly at one side thereof. The foot lever 5 is provided with an adjustable pin 19, which is adapted to project from the side of the lever and engage the lever 18 when the foot lever 5 is moved in a forward position and past the neutral point of the foot lever. The construction of this adjustable pin connection is more clearly shown in Fig. 22, in which it will be seen that the pin 19 extends through the head 20 of a bolt which is inserted through an opening in the lever 5, and is provided on the opposite side of the lever with a nut 21. The foot lever 5 is preferably of I shaped cross section, so that when the nut 21 is tightened upon the bolt 20, the pin 19 will be drawn against the flanges of the foot lever 5 on the opposite side thereof, and the pin may be so adjusted that it will engage the lever 18 at any desired point in the movement of the foot lever.

The selector shaft 10 is preferably disposed substantially below the shaft 6, to which the foot lever 5 is connected, and at one side of the lever 18. Secured to, but preferably formed integral with the gear 12 on the shaft 10, is a projection 22 (see Figs. 20, 21 and 23), which is provided with peripheral grooves 24, the grooves extending spirally about the projection at such a pitch that they overlap in each half of the circumference, thereby forming shoulders 23, diametrically opposite in each groove. Secured to the lever 18 and pivotally mounted to permit the transverse rotation thereof, is an arm 25, which is provided with a pin 26 secured thereto or formed integrally therewith, the pin being adapted to project into the grooves 24 of the projection 22. The outer end of the arm 25 is formed with a portion 27, substantially reduced in width and preferably round in cross section, or having a rounded upper face. The pin 26 is adapted to be seated in the grooves 24 at all times, and it is evident that the pin will be brought into engagement with one of the shoulders 23 of the grooves at each half revolution, thereby preventing the rotation of the shaft 10 for that half a revolution unless means is provided for releasing the pin from its engagement with the shoulder 23. In order to release the pin 26 from such engagement, the foot lever 5 (see Figs. 1, 2 and 6) is provided with a projecting arm or finger 28, which is adapted to engage the arm 25 at the end portion 27 thereof when the foot lever 5 is permitted to be pressed back into its normal position by the clutch spring. By reference to Fig. 6 it will be seen that as the lever 5 is pressed backwardly the finger 28 will engage the arm 25 at one side of the reduced portion 27, thereby pressing the arm 25 laterally and disengaging the pin 26 from its connection with the shoulder 23, whereupon the shaft 10 will be free to rotate in the same direction as it was previously rotated and ready for the next operation. It will be evident that the rotation of the parts referred to will be in the same direction at all times, the relative direction of motion of the shafts 9 and 10 being shown by the arrow in Fig. 2.

The selector shaft 10 (see Fig. 23) is rotatably mounted in one of the side frames 7, and is provided with a central opening in which a selector rod 29 is movable. One end of the shaft 10 is preferably slotted as at 30, to receive the bent end 31 of the selector rod 29. Mounted upon the shaft at this end is a selecting member 32 (shown also in Fig. 21), which is provided with an internal recess 33 to receive the bent end 31 of the rod 29, and with lateral projections 34 on the outer surface thereof, substantially diametrically opposite. This member 32 is formed with a key way and is secured against rotation with respect to the shaft 10 by means of a key 35, which permits the longitudinal movement of the member with respect to the shaft. At the end of the shaft 10 a ring 36 may be provided, which is adapted to limit the movement of the rod 29, and of the member 32 in this direction, the groove 30 limiting the movement thereof in the opposite direction. It will be evident that it is necessary only to provide means for moving the rod 29, while at the same time permitting its rotation, to position the selecting member 32 longitudinally on the shaft 10.

In order to move the selector rod longitudinally and at the same time to permit of its rotation, a connection similar to that shown in Figs. 23, 24 and 25 may be provided. This connection comprises a pair of disks 37, which are inserted upon the rod 29 between the lock nuts 38, and with an internally rigid ring 39 disposed between the disks 37. This ring 39 is provided with pins 40 projecting therefrom, by means of which the ring may be held against rotation and at the same time permitting the rotation of the rod 29.

In order to effect the longitudinal movement of the rod 29 with respect to the shaft 10, any desired or suitable means may be provided, such, for example, as that shown by Figs. 10 and 19 of the drawings. A bell crank 41, having a bifurcated extremity on one arm, adapted to engage the pins 40 of the connection on the rod 29, is pivotally mounted in the frame 7 (see Fig. 1), the other arm being connected by means of a rod 42 to a pivotally mounted arm 43. This latter arm is provided or formed integrally with a gear segment 44. Meshing with the gear segment 44 is a gear 45, connected to a rod or sleeve 46 of a steering post 47. The sleeve 46 extends to the upper end of the post adjacent a steering wheel 48 thereof, and is provided at the upper end with an arm 49. The wheel 48 is also provided with an indicating ring 50 over which the arm 49 is movable, the said ring being provided on its inner face with stop notches 51, and on its upper face with a yielding post or detent 52, disposed between two of the notches 51. This stop is shown in detail by Figs. 12 and 13, from which it will be seen that a button projects through the face of the ring 50, and is held yieldingly in such position by means of a leaf spring 53. The arm 49 is positioned with respect to the notches or recesses 51 in the ring 50 by means of a yielding device, such, for example, as shown by Fig. 11. In this construction the arm 49 is provided with a recess 54 in the edge of the arm which abuts the inner face of the ring 50, and in this recess there is disposed a ball 55 pressed outwardly by a coil spring 56. When the arm 49 is moved so that the opening 54 registers with a recess 51 in the ring, the ball 55 is pressed outwardly by the spring 56, thereby holding the arm 49 in its adjusted position. It will be evident that the rotation of the arm 49 will effect a corresponding movement of the gear segment 44, through the steering post 47, which will be conducted by means of the arm 43, rod 42 and bell crank 41 to the selector rod 29, whereby the selecting member 32 may be positioned as desired with respect to the shaft 10.

If desired a selective device similar to that shown by Figs. 14 to 18 inclusive may be employed. In this construction the side panel of the automobile, if the device is applied to this kind of a machine, is provided with a pivoted lever 57, the upper end of which projects above the panel, and may be varied in position with respect to a face plate 58 in the upper edge of the panel. This face plate is provided with a number of notches 59 which indicate the several selective positions of the lever for the varied corresponding positions of the selecting rod 29. In order to retain the lever 57 in any one of the notches, it may be provided with a lateral projection 60, which is adapted to engage in a notch and to hold the lever in position. The lever preferably has a tendency to be pressed inwardly, so that it is necessary to press it out slightly to dislodge the projection 60 from the notch 59 in which it is seated at any time to change the position of the lever.

Any desirable or suitable transmission mechanism may be employed in this connection, such, for example, as that employed in any well known automobile construction, and in the present exemplification of the invention transmission gears of the class known as the selective type of sliding gear transmission are shown. The essential features of this type of transmission gears are represented comprising the power or driving shaft 61, which may be connected to the clutch through the universal joint 62, as shown in Fig. 1; the transmission shaft 63, which is preferably in line with the shaft 61 and normally freely rotatable with respect thereto. Upon the shaft 61, and within a casing 64, commonly provided for the transmission gears, a driving gear 65 is positioned which meshes with a gear 66 on a jack shaft 67, substantially parallel with the shafts 61 and 63. Fixed to the jack shaft are gears 68, 69, and 70, the latter being in driving engagement with a reverse gear 71, rotatably mounted in the casing 64. Mounted upon the transmission shaft 63 are gears 72 and 73, which are provided with collars 74 and 75 respectively formed integral with or secured to them. These gears are moved into engagement with the gears 68, 69, and 71 to effect the different changes in speed between the transmission shaft 63 and the jack shaft 67. To lock the shafts 61 and 63 in direct driving engagement, it is necessary only to move the gear 72 into engagement with the gear 65, the gear 72 being provided with integral lugs or teeth (not shown) to engage with corresponding lugs or teeth of the gear 65. In order to effect the movement of the gears 72 and 73 longitudinally movable bars 76 and 77 are provided, which extend substantially parallel with the shaft 63 through the opposite ends of the transmission case 64. These bars 76, 77 are preferably mounted in sleeves 78, 79, which are secured in the ends of the transmission case and are provided with slots 80, 81. Yoke members 82 and 83 having the tubular portions 84 and 85 are movable longitudinally upon the sleeves 78 and 79, respectively, the yoke portions of the said members engaging the collars 74 and 75 of the gears 72 and 73 respectively. These members are secured to the respective bars 76 and 77, through the slots 80 and 81 by means of the keys 86, 87, so that the movement of the bars effects the corresponding movement of the gears 72 and 73. The sleeves 78 and 79 are spaced apart, and are preferably formed with a collar portion 88 secured thereto or formed integral therewith, and from which projects a tongue 89 having a perforation 90. The sleeve members 78 and 79 are also provided with perforations 91 and 92 in alinement with the perforation 90 and the tubular portions 84 and 85, are likewise provided with perforations, all of which perforations are adapted to register when the gears are in their neutral or inoperative position. The bars 76 and 77 are provided with recesses 93 and 94 which are also adapted to register with the said perforations when the bars are in their central position, so that a recess or chamber is formed to receive a ball 95. This ball is adapted to be retained in position in this recess, and is of a diameter sufficient to engage in the recess of one of the bars when the other bar is moved, to prevent the movement of the first named bar after the other bar has been moved. At such a time the tubular portion of the forward bar would move past the opening in the tongue, and would cause the ball to be moved into the recess of the other bar. The bars 76 and 77 are operated from one end thereof to position the gears 72 and 73, and at the other end of the bars, where they project from the ends of the sleeves 78 and 79, they are provided with means tending to retain the bars in a central or neutral position. In the present exemplification of the invention this means comprises collars 96, secured to or formed integral with the bars 76 and 77, bar sleeve members 97, surrounding the bars, and preferably threaded on the adjacent ends of the sleeve members 78 and 79, and coil springs 98 disposed about the bars on both sides of the collars so that they abut the sleeve members 78—79 at one end and the other end of the sleeve members 97 at the other end. It is evident from this construction that the tendency of the springs is to return the bars to the neutral position.

A locking device is provided for the bars 76—77 at the other end of the transmission case, the details of which are shown more clearly in Figs. 2, 4 and 5. At this point the sleeve members 78—79 are provided with notches 99, and the bars 76 and 77 are also provided with notches 100, 101, 102, and 103. These notches correspond to the various positions of the bars when the movable gears 72 and 73 are in their different driving connections. When one of the gears is in its proper driving connection the corresponding notch in the bars 76 or 77 will register with one of the notches 99 in the sleeve member, and a latch 104 is provided to engage in the said notches. In the preferred construction this latch 104 is preferably mounted in a slidable member 105, having a bifurcated extremity and the shoulders 106 to engage the upper edge 107 of the latch to prevent its rotating about the point of pivotal support more than a predetermined amount. The slidable member 105 is provided with a guide pin 108, and is slidably mounted in a guide 109 secured to the upper portion 110 of the transmission case 64. A perforated guiding member 111 is also secured to the top of the casing 110 to provide a guide for the pin 108, and a coil spring 112 is positioned upon the pin 108 between the guide 111 and the slidable member 105, which tends to press the slidable member 105 downwardly, so that the latch member 104 will be pressed normally into engagement with the bars 76 and 77, so that the notches in them will be engaged if they are in the proper position. The latch 104 and the slidable member 105 is moved vertically into and out of the engaging position, and for the purpose of moving them out of the engaging position a lever 113 is pivotally connected to the slidable member 105 intermediate of the ends of the lever, one of the ends being pivotally connected as at 114 to a fixed portion of the transmission case 110. The other end of the lever 113 is free to move in a vertical direction, and in order to effect this movement a lever 115 is pivotally secured to some fixed portion of the frame and is provided with an adjustable contacting member such as the threaded bolt 116, which is adapted to contact with the free end of the lever 113. By adjusting a lock nut 117 the bolt 116 may be adjusted in any desired position. The lever 115 may be pivotally mounted upon any fixed portion of the frame to which the mechanism is secured, but in the present exemplification of the invention it is preferred that it be pivotally mounted upon a transversely extending plate 118 through an opening 119 in which (see Figs. 21 and 23) the other end of the lever extends. The end of the lever which projects through the plate 118 is disposed in proximity to the lateral face of the gear 12, and projecting from this gear at diametrically opposite points from the face thereof are projections 120 which are adapted to engage the projecting end of the lever 115. From an inspection of Fig. 21 it will be seen that these projections 120 are substantially in horizontal alinement with the projection 34 of the selecting member 32. As the selecting shaft 10 is rotated it will be evident that the pins 120 will bear downwardly upon the lever 115, which will cause the other end to rise and to engage the free end of the lever 113, thereby raising the latch 114 and disengaging it from its latching position with respect to the bars 76 and 77. It will be noticed that this action will take place before the projections or lugs 34 of the selecting member 32 are in a vertical position, so that the locking device for the bars 76 and 77 are disengaged before the selecting member assumes this position.

In order to move the gear shifting bars 76 and 77 they are provided at the end adjacent the locking device with yokes 121 and 122 respectively (see Figs. 1 and 2), and secured to the yokes in different parallel vertical planes are projecting arms 123, 124, 125, 126, which also project through the plate 118 and are provided at their outer ends with bent tips. Each yoke is adapted to support two arms and the bent tips of the arms being substantially above and below the center of the shaft when they are in neutral position. The arms of each pair are spaced apart at such a distance that the bent tips thereof may be engaged by the projections 34 of the selecting member 32, as it is rotated with the selecting shaft 10, and since the several arms are disposed in parallel planes, it is evident that for any position of the selecting member 32 there is but a single corresponding arm, so that only one arm may be engaged by the selecting member. It will also be evident that since one arm is above the selecting member while the other is below it, the single direction of rotation of the selecting member is sufficient to move the arms, and consequently the bars to which they are connected in both directions and in order to effect the movement of one of the bars, and the shifting of the corresponding gear, it is necessary only to position the selecting member with respect to one of the arms and to cause the rotation of the selecting shaft 10. The neutral position of the selecting member 32 is preferably between the arms of each pair, and in the neutral position it is free from engagement with any of the arms. (See Figs. 1 and 23).

It will be seen that when the bars 76 and 77 are positioned by means of the selecting mechanism, they will be locked in the selected position by means of the locking device at the end of the bar and that before the selecting mechanism can operate to effect a change in position of either of the bars 76 and 77 it is necessary to rotate the selecting shaft 10, whereupon the lever 115 will be engaged to release the locking device, and therefore to release the bar 76 or 77 from its locked position. The automatic positioning device, comprising the springs 98 at the other end of the bar, will operate thereupon to center the bar and to draw the selected gear out of its engaging position to the neutral position. The bars 76—77 and their operating arms are moved to their normal and neutral position, so that any one of the arms may be engaged by the selecting device.

In the present exemplification of the invention four different positions of the shifting gears 72—73 are possible, corresponding to a reverse driving position and first, second and high speed in the normal operating directions. This is the arrangement commonly employed in automobile transmission, and no further explanation is deemed necessary. It will, however, be noted that the gear 73 is adapted to be used in the first driving connection or for the reverse driving connection, while the other gear is for the second speed and high speed connections.

Assuming the parts as shown in the drawings to be in their neutral position, including the position of the foot lever 5, and the power member 1 to be rotating in the direction of the arrow, as viewed in Fig. 2, the selecting mechanism may be placed in any desired position. If the selecting and indicating arm 49 is placed in the position corresponding to the first speed, the selecting rod 29 will be correspondingly moved by means of the connection to the indicating arm, which in turn will position the selecting member 32. In order to accomplish this result, the foot lever 5 must be in the neutral position, as shown in Fig. 2, and at this time the clutch will be released from engagement with the driving shaft 61, because the foot lever 5 is operated to press the clutch out of such engagement. With the selecting member 32 in the desired position it is necessary to effect the rotation of the selecting member by rotating the shaft 10. This is accomplished by pressing the foot lever 5 in a forward direction, whereby the pin 19 will engage the lever 18, causing a movement of the yoke 17 which moves the collar 14 in a forward direction. To this collar is attached the pulley 13, which is thereupon pressed into driving engagement with the rotating clutch member 2, and against the pressure of the spring 15. Since the pulley 13 is secured to the shaft 9, the worm gear 11 is rotated, which in turn causes the rotation of the gear 12 with which the worm gear meshes. This effects the rotation of the selecting shaft 10, and as the gear 12 rotates one of the pins 120 is brought into engagement with the lever 115, which engages the bar locking device at the ends of the bars 76 and 77 and releases them from engagement if they have been previously positioned. At this time the operating arms 76 and 77 are all in neutral position, and as the shaft 10 is rotated the selecting member 32, which has been previously positioned, is also rotated, one of the projections 34 thereof being brought into engagement with one of the bar operating arms corresponding to the position of the selecting member. The continued rotation of the selecting shaft 10 effects a movement of the corresponding operating arm, which in the present instance is the arm 125, which corresponds to the first speed. The engagement of this arm will draw the bar 77 outwardly until the gear 73 meshes with the gear 69 on the selector shaft 67. As soon as these two gears are brought into driving engagement, the driving connection with the transmission shaft from the drive shaft 61 is completed, and it is necessary only to permit the clutch to engage to provide a complete driving connection from the motor to the transmission shaft 63. As soon as the bar which shifts the gear has been positioned the selecting shaft will be stopped from rotation. This stopping is effected by means of the pin 26, which is carried by the arm 25, pivotally mounted on the lever 18. The rotation of the selecting shaft 10 and the member 22 secured thereto causes the arm 25 to be slightly rotated with respect to its pivotal mounting because of the engagement of the pin 26 in the groove 25, while the pin is brought into engagement with one of the shoulders 23, whereupon the projections 34 of the selector member 32 are moved out of their engaged position, and the selecting shaft 10 is stopped from rotating. At this time the pin 26 which engages the shoulder 23 causes the lever 18 to be drawn sharply rearward, that is, in the direction contrary to its operated position, whereupon the pulley 13 will be drawn out of operating engagement with the rotating member 2, and the upper end of the lever 18 will be brought in contact with the pin 19, whereupon a sharp kick or contact will be made with the pin, causing a corresponding movement of the foot lever 5, which operates as notice to the operator of the foot lever that the selected gear is in the proper driving position. As the pulley 13 is out of driving engagement and the shoulder 23 of the member 22 on the selecting shaft 10 is engaged by the pin 26, the selector shaft will be stopped and the only operation that is necessary to complete the driving connection from the proper element to the transmission shaft is to permit the clutch to be engaged. This is effected by permitting the foot lever 5 to be thrown backwardly by the action of the clutch spring, whereupon the clutch will be in engagement and a complete driving connection will be completed from the motor to the transmission shaft. It will be evident that under these circumstances the pin 26 would be in engagement with the shoulder 23 were it not for the fact that the finger 28 which is secured to the foot lever 5 is operative to press the arm 25 laterally when the foot lever is allowed to be pressed backwardly by the action of the clutch spring. This action positions the pin 26 so that the member 22 and the selecting shaft 10 to which it is secured will be in readiness for another operation whenever desirable.

To change the driving connection from one gear to another it is necessary only to release the clutch by pressing the foot lever 5 to neutral position, whereupon the selecting arm 49 adjacent the steering wheel may be positioned in the desired position and the operation just described completed. It will be evident from the previous description of the mechanism that as soon as the locking device is disengaged by the positive operation of the selecting shaft, the bars 76—77, and consequently the transmission gears which are moved thereby, will be in a neutral position, whereupon the operating arms will also be in the neutral position, so that they may be engaged by the selecting member as it rotates, and as previously set forth. From this description it is manifest that it is impossible to shift the gears when the clutch is in clutching position, and that it is absolutely necessary to release the clutch before any change can be made. If it is desired only to release the clutch temporarily, it is not necessary to press the foot lever 5 entirely forward in order to place the transmission mechanism in the same operative position, for unless the position of the selecting arm 49 is changed the selecting mechanism will remain in the same position as the selected gear will be in the previously selected position.

It will be noticed that a detent or stop device is provided to prevent the accidental reversal of the mechanism from a forward driving position to the reverse. It frequently happens that an inexperienced person in changing the gears accidentally presses the driving gears in a direction opposite to that which he intended, thereby resulting in danger, and sometimes in damage to the vehicle. With the present device the stop 52 must be positively pressed out of engagement before the selecting lever 49 can be placed in the reverse position.

With this mechanism it is evident that the gear shifting levers are eliminated, it being necessary only for the operator of the mechanism to position a selecting arm with respect to an indicating segment and to utilize the power derived from the motive agency for effecting the gear shifting operation. The selecting operation is comparatively simple and constitutes nothing more than the mere shifting of an easily operable arm, the real gear shifting operation being effected by means of the power of the motor. By having the selecting and indicating lever in connection with the steering wheel, not only is a more compact and convenient arrangement presented, but also a construction which is novel and presents many features of improvement over the existing operating mechanisms.

While I have thus described the preferred construction, combination and arrangement of the several parts which constitut my invention, it is evident that those skilled in the arts to which this appertains may make various changes without departing from the spirit and scope of the invention. I desire, therefore, not to be limited to the exact construction of the parts herein shown and described.

What I claim as new is:—

1. The combination with a driving member, of variable speed transmission gears, and means to make the gears operative by application to the driving member.

2. The combination with a driving member, of variable speed transmission gears, and means to change the gears at will by the operating of the driving member.

3. The combination with a driving member, of variable speed transmission gears, and means to effect the changing of the gears by the application thereof to the driving member.

4. The combination with a driving member, of variable speed transmission gears, and means operable at will to utilize the power from the driving member to effect the changing of the said gears.

5. The combination with a driving member, of variable speed transmission gears, and means depending upon its application to the driving member to effect the changing of said gears.

6. The combination with a driving member, of variable speed transmission gears, and gear selecting means, and mechanism depending upon its application to the driving member to effect the operative engagement of the selected gear.

7. The combination with a driving member, of variable speed transmission gears, mechanism selectively actuated to utilize power from the driving member to place one of the transmission gears in driving connection.

8. The combination with a driving member, of variable speed transmission gears, means for selecting one of the transmission gears, and mechanism actuated after such selection to apply power from the driving member to place the selected gear in connection with the driving member.

9. The combination with a driving member, of variable speed transmission gears, gear selecting means, and mechanism applicable to the driving member to effect the shifting of the gearing in accordance with the operation of said means by the power of the driving member.

10. In mechanism of the class described, the combination with a driving member, of variable speed transmission gears, a clutch therefor, gear selecting means, and mechanism actuated when the clutch is released to place a selected transmission gear in position by the power of the driving member whereby the gear will be in driving connection with the said member when the clutch operates.

11. In mechanism of the class described, the combination with a driving member, of variable speed transmission gears, gear selecting means, and mechanism frictionally to engage the said driving means and operative when so engaged to effect a driving connection of the selected transmission gear.

12. In mechanism of the class described, the combination with a power driven member, of a transmission shaft separate therefrom, variable speed transmission gears, means to indicate a gear to be placed in operative connection with the said shaft, and means frictionally to engage the said member to effect the selection of a gear and to place it in said operative connection.

13. In mechanism of the class described, the combination with a power driven member, of a transmission shaft separate therefrom, variable speed transmission gears, means to indicate a gear to be placed in operative connection with the said shaft, and means to lock the gears when one is in the selected position.

14. In mechanism of the class described, the combination with a power driven member, of a transmission shaft separate therefrom, variable speed transmission gears, means to indicate a gear to be placed in operative connection with the said shaft, and means to automatically lock the gear in the selected position.

15. The combination with a rotatable power driven member, of a transmission shaft, transmission gears, a clutch to connect the member and the shaft through the intermediary of the transmission gears, means to indicate and determine a gear to be selected, and mechanism to engage the said rotatable member and place the selected gear in operative connection with the transmission shaft.

16. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, and means to lock the said mechanism in position.

17. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, and means automatically to lock the said mechanism in position.

18. The combination with a rotatable power driven member, of a transmission shaft, transmission gears, a clutch coöperating with said gears, to connect the member and the shaft, means to indicate and determine a gear to be selected, mechanism to engage the said rotatable member and place the selected gear in operative connection with the transmission shaft, means to lock the said mechanism in position, and means to disengage the locking means when the clutch is applied.

19. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, means to lock the said mechanism in position, and means automatically to disengage the locking means when the clutch is applied.

20. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, means automatically to lock the said mechanism in position, and means automatically to disengage the locking means when the clutch is applied.

21. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, and means to operate said mechanism at will.

22. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, and means to release the mechanism from its connection with the rotatable member when the selected gear is in operative position.

23. The combination with a rotatable power driven member, of a transmission shaft, transmission gears, a clutch coöperating with said gears to connect the member and the shaft, means to indicate and determine a gear to be selected, mechanism to engage the said rotatable member and place the selected gear in operative connection with the transmission shaft, means to operate said mechanism at will, and means automatically to release the mechanism from its engagement with the rotatable member when the selected gear is in operative position.

24. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and means to operate the mechanism at will.

25. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and means to control the operation of the said mechanism at will.

26. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and a single means to control the operation of said clutch and said mechanism.

27. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, and a lever operative to actuate the said mechanism when the clutch is released.

28. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, a lever operable to apply the said mechanism to engage the rotatable member when the clutch is disengaged, and means to release the mechanism from such engagement when the selected gear has been positioned.

29. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, a lever operable to apply the said mechanism to engage the rotatable member when the clutch is disengaged, and means to strike the lever when the selected gear has been positioned in operative engagement with the transmission shaft.

30. The combination with a rotatable power driven member, of a transmission shaft, transmission gears, a clutch coöperating with said gears to connect the member and the shaft, means to indicate and determine a gear to be selected, mechanism operable to engage the said rotatable member and to place the said gear in operative connection with the transmission shaft when so engaged, a foot lever operable to press the said mechanism to frictionally engage the rotatable member, and means to release the mechanism independently of said lever.

31. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever to press the said mechanism frictionally to engage the rotatable member, and a lever operated by the said mechanism when the selected gear is in position to release the said mechanism from its engagement with the rotatable member.

32. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, means acting normally to press the said mechanism out of said engagement, and a lever operable at will to overcome said pressure and frictionally to engage the mechanism with the rotatable member.

33. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, means acting normally to press the said mechanism out of said engagement, a lever operable at will to overcome said pressure and frictionally to engage the mechanism with the rotatable member, and means in connection with the lever and engaged by the mechanism when the selected gear is in position operative to move the lever whereby the above said means will press the mechanism out of said engagement.

34. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, and a lever operative to control the clutch and to press the other lever into position to cause the engagement of said mechanism.

35. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, a lever operative to control the clutch and to press the other lever into position to cause the engagement of said mechanism, and means independent of the last said lever to destroy such engagement.

36. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, a clutch controlling lever, and adjustable means in connection therewith to engage the first mentioned lever to press it into position to operate the said mechanism.

37. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, a clutch controlling lever, an adjustable pin in connection therewith to engage the first mentioned lever to press it into position to operate the said mechanism, and means in connection with the first named lever to engage the mechanism when the selected gear is positioned and to release the mechanism from its engagement with the rotating member by the movement of said lever.

38. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, a clutch controlling lever, an adjustable pin in connection therewith to engage the first mentioned lever to press it into position to operate the said mechanism, an arm in connection with the first named lever to engage the mechanism when the selected gear is positioned and to release the mechanism from its engagement with the rotating member by the movement of said lever, and means in connection with the clutch lever to release the arm from its engaged position.

39. The combination with a rotatable power driven member, of a transmission shaft, transmission gears, a clutch coöperating with said gears to connect the member to the shaft, means to determine and indicate a gear to be selected, mechanism operable to engage the said rotatable member and to position the selected gear in operative connection with the transmission shaft when so engaged, a lever operative to control the engagement of the mechanism with the rotatable member, a clutch controlling lever, an adjustable pin in connection therewith to engage the first mentioned lever to press it into position to operate the said mechanism, an arm in connection with the first named lever to engage the mechanism when the selected gear is positioned and to release the mechanism from its engagement with the rotating member by the movement of said lever, and a finger extending from the clutch lever operative to engage the arm of the other lever and to move it laterally to release it from engagement with the mechanism when the clutch is applied.

40. In a mechanism of the class described, the combination with a plurality of transmission gears, of means for shifting the gears into different driving connections, selecting means for the gears comprising a movable arm accessible to the operator, a member movable into different positions to engage the different shifting means, and means to connect the said member and the movable arm and to effect the application of the member to the selected gear shifting means.

41. In a mechanism of the class described, the combination with a power member, of a transmission shaft, transmission gears, means for shifting the gears into different driving connections, selecting means for the gears comprising a movable arm accessible to the operator, a member operatively connected to the arm and movable thereby into different selecting positions, the said member being provided with means to engage the gear shifting means, and mechanism applicable to the power member to effect the gear shifting operation.

42. In a mechanism of the class described, the combination with an engine, of a transmission shaft, transmission gears, some of them being movable into engagement with the other gears, shafts movable with the said movable gears, selecting means for the gears comprising a movable selecting and indicating arm, a member operatively connected to the arm and movable thereby into different selecting positions, arms projecting from said movable shafts adjacent opposite sides of the said member, the said member being provided with lugs to engage one of the said arms, and means applicable to the engine at will to effect the operative movement of the said member to shift the selected gear in driving connection with the transmission shaft.

43. In a mechanism of the class described, the combination with a source of driving power, of transmission gears, a clutch lever and clutch, means to select and indicate a transmission gear to be used, mechanical means applicable to the source of power to position the selected gear in driving engagement and means to operate the said mechanical means by the movement of the clutch lever.

44. In a mechanism of the class described, the combination with a source of power, of transmission gears, selecting means to determine a gear to be used, means operable to engage the source of power and by such engagement to cause the selected gear to be placed in driving engagement, and means to effect the operation of said engaging means.

45. In a mechanism of the class described, the combination of transmission gears, indicating and selecting means comprising an arm rotatable about an indicator dial upon a fixed axis and operative to predetermine the gear to be used, a power shaft, and means for transmitting the power of said shaft to shift the selected member.

46. The combination with power transmitting mechanism, comprising a transmission shaft and gears movable into driving connection therewith, of a motor therefor, selecting means for different gears, comprising a movable arm, a movable positioning rod and means to connect the arm to the rod and to transmit motion thereto, and means to engage the motor and to shift the selected gear into driving position.

47. The combination with power transmitting mechanism, comprising a transmission shaft, and gears movable into driving connection therewith, of gear selecting means comprising a movable arm and indicator, a movable selector rod connected therewith and having a fastening which permits the rotation of the rod, and means to shift the said gears after the operation of the selecting means, the said rod being rotated during the shifting operation.

48. The combination with power transmitting mechanism, comprising a transmission shaft, and gears movable into driving connection, therewith, of gear selecting means comprising a movable arm and indicator, a selector shaft substantially at right angles to the axes of the gears, a selecting member longitudinally movable upon the shaft, and means in connection with the said movable arm to position the member, and means to shift the gears into predetermined position by the rotation of the said shaft.

49. The combination with power transmitting mechanism, comprising a transmission shaft, and gears movable into driving connection therewith, of gear selecting means comprising a movable arm and indicator, a slotted selector shaft extending transversely of the axes of the gears, a selecting member keyed to the shaft and movable thereon, a rod movable in the shaft and in engagement with the said member, and means connecting the rod and the selector arm, and means to rotate the shaft.

50. The combination with power transmitting mechanism, comprising a transmission shaft, and gears movable into driving connection therewith, of gear selecting means comprising a movable arm and indicator, a slotted selector shaft extending transversely of the axes of the gears, a selecting member keyed to the shaft and movable thereon, a rod movable in the shaft and in engagement with the said member, a worm gear and a worm in connection with the said shaft to rotate it, and means to effect the rotation of said shaft at will.

51. The combination with power transmitting mechanism, comprising a transmission shaft, and gears movable into driving connection therewith, of gear selecting means comprising a movable arm and indicator, a rotatable selector shaft, a selecting member movable thereon provided with projections, and means in connection with said arm to position the said member, bars movable to position the said gears, and means to rotate the said shaft whereby the selected gear will be shifted into driving position.

52. The combination with power transmitting mechanism comprising a transmission shaft, gears movable into different driving connection with said shaft, bars to move the gears, selecting mechanism comprising a movable arm and indicator, a rotatable selector shaft, a selecting member movable on the shaft and having cams or projections to engage the said bars when the member is positioned and rotated, and means to rotate the shaft and said member whereby a predetermined gear may be shifted.

53. The combination with power transmitting mechanism comprising a transmission shaft, gears movable into different driving connections with said shaft, longitudinally movable bars for shifting the gears, selecting mechanism adapted to be moved in position to engage one of the bars, and means to operate the selecting mechanism whereby a predetermined gear may be placed in driving connection with the transmission shaft.

54. The combination with power transmitting mechanism comprising a transmission shaft, gears movable into different driving connections with said shaft, longitudinally movable bars for shifting the gears, selecting mechanism comprising a rotatable selector shaft, a selecting member having cams or projections and movable upon the shaft, means to position the said member, arms attached to the said bars extending on opposite sides of the said shaft, the rotation of the shaft being effective to engage the projections of the said member with one of the arms when the member is in position, and means to rotate the shaft.

55. The combination with power transmitting mechanism comprising a transmission shaft, gears movable into different driving connections with said shaft, longitudinally movable bars for shifting the gears, selecting mechanism comprising a rotatable selector shaft, a selecting member having cams or projections and movable upon the shaft, means to position the said member, arms attached to the said bars extending on opposite sides of the said member whereby the rotation thereof in a single direction may be effective to move one of the bars in either direction in accordance with the position of the selecting member, and means to rotate the shaft.

56. The combination with power transmitting mechanism comprising a transmission shaft, gears movable into different driving connections with said shaft, longitudinally movable bars for shifting the gears, selecting mechanism comprising a rotatable selector shaft, a selector mechanism having cams or projections and movable upon the shaft, means to position the said member, arms attached to the said bars extending on opposite sides of the said member and spaced apart, each arm being in a different plane transversely with respect to the shaft, the said projections being adapted to engage one of the arms corresponding with the position of the selecting member when the latter is rotated, and means to rotate the shaft.

57. The combination with power transmitting mechanism comprising a transmission shaft, gears movable into different driving connections with said shaft, longitudinally movable bars to which the movable gears are secured, arms extending upwardly and downwardly from the bars and with forward projections disposed in different planes, a guide plate through which the forward projections extend, selecting mechanism comprising a movable arm and indicator, a rotatable selector shaft, a selecting member movable on the shaft and having projections which are adapted to engage the forward projections when the said member is rotated and which are operative to move a predetermined bar in either direction corresponding with the position of the said member, and means to rotate the said member 58. The combination with power transmitting mechanism comprising a transmission shaft, gears movable into different driving connections with said shaft, longitudinally movable bars to which the movable gears are secured, arms extending upwardly and downwardly from the bars and with forward projections disposed in different planes, a guide plate through which the forward projections extend, selecting mechanism comprising a movable arm and indicator, a rotatable selector shaft, a selecting member movable on the shaft, and having projections which are adapted to engage the forward projections when the said member is rotated and which are operative to move a predetermined bar in either direction corresponding with the position of the said member, means to lock the said bars in normal and in selected position, means depending upon the rotation of the said shaft for releasing the locking means when the member is rotated, and means to rotate the said member.

59. The combination with power transmitting mechanism comprising a transmission shaft, gears longitudinally movable into different driving connections with said shaft, longitudinally movable bars to which the movable gears are secured, the bars being provided with notches and having arms secured to them spaced apart and disposed in parallel planes, selecting mechanism comprising a selecting member, and means to position the latter with respect to the said arms, means to move the bars longitudinally, a locking device for the bars, adapted to engage in the said notches when the selecting member is positioned, and means to release the device from such engagement when the selecting member rotates, and means to rotate the latter member in moving the selected gear into driving connection.

60. The combination with power transmitting mechanism, comprising a transmission shaft, gears longitudinally movable into different driving connections with said shaft, longitudinally movable bars to which the movable gears are secured, the bars being provided with notches and having arms secured to them spaced apart and disposed in parallel planes, selecting mechanism comprising a selecting member, and means to position the latter with respect to the said arms, means to move the bars longitudinally, a locking device for the bars comprising a spring pressed latch adapted to engage in a notch in either bar, means to release the latch when the selecting mechanism is operated.

61. The combination with power transmitting mechanism comprising a transmission shaft, gears longitudinally movable into different driving connections with said shaft, longitudinally movable bars to which the movable gears are secured, the bars being provided with notches and having arms secured to them spaced apart and disposed in parallel planes, selecting mechanism for determining and indicating the gear to be placed in driving connection, means to effect the movement of the selected gear into driving connection with the said transmission shaft, a spring pressed latch adapted to engage in a notch in either bar, a lever operated by the selecting mechanism when it is operated effective to release the latch from its engagement.

62. The combination with power transmitting mechanism, comprising a transmission shaft, gears longitudinally movable into different driving connections with said shaft, longitudinally movable bars to which the movable gears are secured, the bars being provided with notches and having arms secured to them spaced apart and disposed in parallel planes, selecting mechanism for determining and indicating the gear to be placed in driving connection, means to effect the movement of the selected gear into driving connection with the said transmission shaft, a spring pressed latch normally movable into engagement with a notch in either bar when the latter is moved into position for the selected driving connections, and adjustable means to engage the latch to release it when the selecting means is operated.

63. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, means to prevent the movement of one bar when the other is in a moved position, and locking means to retain the moved bar in the selected position.

64. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, a spring pressed latch comprising a pivoted plate movable about its pivot to engage in the notches of either bar, and means to limit the extent of pivotal movement of said plate.

65. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, means to prevent the movement of one bar when the other is in a moved position, the said bars being each provided with a recess in their adjacent sides, the recesses being registering when the bars are in neutral position, the said preventing means comprising a ball adapted to be seated in said recesses, and means to hold the ball in a fixed position, the ball being slightly less in diameter than the distance apart of the bars and one of the recesses.

66. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, means tending to center the bars in their neutral position, and means to lock them in the selected position for the corresponding driving connection.

67. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disclosed in parallel planes, selecting mechanism for determining and indicating the gear to be placed in driving connection, means to effect the movement of the selected gear into driving connection with the said transmission shaft, means tending to center the bars in their neutral position, and means to prevent the movement of one bar when the other is in position for a driving connection of the gears.

68. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, means tending to center the bars in their neutral position, means to prevent the movement of one bar when the other is in position for a driving connection of the gears, and means to lock the moved bar in position for the driving connection selected.

69. The combination with power transmitting mechanism, comprising a transmission shaft, gears longitudinally movable into different driving connections with said shaft, longitudinally movable bars to which the movable gears are secured, the bars being provided with notches and having arms secured to them, spaced apart and disposed in parallel planes, selecting mechanism for determining and indicating the gear to be placed in driving connection, means to effect the movement of the selected gear into driving connection with the said transmission shaft, means tending to retain the bars in their neutral position, comprising a fixed shell surrounding each bar, a collar integral with or secured to the bar and coil springs, on each side of the collar, pressing with substantially equal pressure against the ends of the sleeve, and means to lock either lever in position for the selected driving connection.

70. In a mechanism of the class described, the combination with a transmission gear case, of a drive shaft, a transmission shaft, transmission gears, movable gears for completing driving connection, movable bars for shifting the positions of the driving gears, sleeves for receiving the bars extending through the sides of the gear case, the ends of the bars protruding from the ends thereof, resilient means at one end of the bars tending to maintain them in a given position, means to lock the bars in position, selective means operative at will to determine the gear to be placed in driving engagement, and means to move the selected gear into the predetermined driving position by the power of the driving means.

71. In a mechanism of the class described, the combination with a transmission gear case, of a driven shaft, a transmission shaft, transmission gears, movable gears for completing driving connections, movable bars for shifting the positions of the driving gears, slotted sleeves in which the bars are movable, the sleeves extending through the sides of the gear case parallel with the shafts, a gear shifting member secured to each of the bars and movable on the sleeve member, the said members being keyed to the bars through the slots in the sleeves and permitted to move longitudinally thereof by said slots, selective means to determine the desired gear, and means in connection with the drive shaft to move the predetermined gear into driving engagement.

72. In a mechanism of the class described, the combination with a transmission gear case, of a drive shaft, a transmission shaft, transmission gears, movable gears for completing driving connections, movable bars for shifting the positions of the movable gears, slotted sleeves spaced apart and connected and formed with a perforated tongue extending between them, the said sleeves extending through the sides of the gear case adapted to receive the bars and to permit the longitudinal movement thereof, the said sleeves being formed with openings in the adjacent sides in line with the perforation in the tongue, the bars being each formed with a recess in the side which registers with the said openings in the sleeve when the bars are in neutral position, a movable ball adapted to be positioned in said perforations, openings, and recesses, and of such a size that it permits the movement of one of said bars and prevents the movement of both said bars simultaneously, selective means to determine and indicate the desired gear, and means to apply the power of the drive shaft to shift the said bars into the selected positions.

73. In mechanism of the class described, the combination with a driving motor, of a transmission shaft and gears, bars movable to shift the gears into different driving connections comprising forward and reverse connections, means to apply the power of the driving member to shift the bars and the gears into different driving connections, and selective means to determine and indicate the desired connection.

74. In mechanism of the class described, the combination with a driving motor, of a transmission shaft and gears, bars movable to shift the gears into different driving connections comprising forward and reverse connections, means to apply the power of the driving member to shift the bars and the gears into different driving connections, selective means to determine and indicate the desired connection, and means to prevent the movement of the selective means into the reverse position.

75. In mechanism of the class described, the combination with a driving motor, of a transmission shaft and gears, bars movable to shift the gears into different driving connections comprising forward and reverse connections, means to apply the power of the driving member to shift the bars and the gears into different driving connections, selective means to determine and indicate the desired connection, and means to prevent the movement of the selective means into the reverse position without operative attention thereto.

76. In a mechanism of the class described applied to a motor vehicle, the combination with a driving motor, a transmission shaft and gears, bars movable to shift the gears into different driving connections comprising forward and reverse connections, means to apply the power of the motor to shift the gears by means of the bars, selective means to determine the desired driving connection comprising an indicating arm, and a removable stop to prevent the selective means to be moved into the reverse selecting position.

77. In a mechanism of the class described as applied to a motor vehicle, the combination with a driving motor, a transmission shaft and gears, bars movable to shift the gears into different driving connections comprising forward and reverse connections, means to apply the power of the motor to shift the gears by means of the bars, selective means to determine the desired driving connection comprising an indicating arm rotatable about an axis and having an indicating segment over which the arm moves, and a spring pressed stop protruding through the segment and disposed between the reverse and the forward indicating positions of the arm, the said stop preventing the movement of the arm in a contrary direction until the operator's attention is directed to the stop.

78. The combination with a shaft and variable speed transmission mechanism therefor, including a plurality of sets of power transmission elements, of means for placing any set of said transmission elements in driving relation with the shaft at selected times, and mechanism by which one set of said transmission elements may be selected for subsequent operation while another set of transmission elements is in operation.

79. The combination with a shaft, a clutch therefor and a pedal for operating the clutch, of transmission mechanism including sets of power transmission elements, means for placing any set of transmission elements in and out of driving relation with the shaft at selected times, and mechanism for selecting one set of transmission elements, while another set of such elements is in operation, such selected set of elements being moved into operation upon a subsequent actuation of the pedal.

80. The combination of a transmission mechanism embodying a shiftable gear-changing element, a shifting member for said element, a clutch adapted to drive the transmission mechanism, means operative to disengage the clutch, means to operate said member to effect a selected gear change, and means operative to set said member for different selected gear changes while said clutch is engaged.

81. In a device of the class described, in combination with a plurality of members each adapted to be moved between two different positions corresponding with a different speed to be used, a selector device movable between different positions one corresponding to each of the speed positions of the first mentioned members, and a mechanism operatable only with the assistance of the selector device adapted when the selector is in position for a given speed to move the first mentioned member which controls that speed into the position which will produce that speed.

82. The combination of a transmission mechanism embodying a shiftable gear-changing element, a shifting member for said element, a clutch adapted to drive the transmission mechanism, means operative to disengage the clutch, means to operate said member to effect a selected gear change, and means operative to set said member for different selected gear changes while the clutch is engaged or disengaged.

83. The combination with a power shaft and gear shifting members, of means for selecting the member to be shifted, and means for transmitting the power of said shaft to shift the selected member.

84. In a device of the character described, the combination of a power shaft, gear shifting members, means for selecting the member to be shifted, and means for transmitting the power of said shaft, to shift said member, said last named means comprising a selector shaft and devices by which it may be connected with the gear shifting members.

85. In a device of the character described, the combination of a power shaft, gear shifting members, means for selecting the member to be shifted, and means controlled by the operator for transmitting the power of said shaft to shift said member, said last named means comprising a selector shaft and devices by which it may be connected with the gear shifting members.

86. In a gear shifting device, a series of gear shifters, power operated means for actuating the gear shifters, means to set the power operated means in motion, and means automatically stopping the power operated means upon completion of a predetermined actuation of the gear shifters.

87. In combination in a power driven vehicle, a source of power, a gear shifting mechanism, and means whereby the driving power is transmitted to said mechanism.

88. In an interchange speed gear mechanism, the combination with the driving element and a plurality of change gear operating means, of means adapted to be thrown in connection with the driving element for actuating any one of the aforesaid operating means.

89. In a power driven vehicle, a driving element, gearing adapted to be selectively driven thereby, a foot pedal-operated device to connect and disconnect the gearing and driving element, and a gear shifting mechanism adapted to be operatively connected with the driving element by means of said foot pedal.

90. In an interchange speed gear mechanism, the combination with the engine shaft and plurality of speed gear operating shifters, of means adapted to be thrown in and out of connection with the engine shaft for operating any of the aforesaid shifters, and an independently operated shifter selecting device whereby the shifter desired is placed in operative connection with the engine shaft, as and for the purpose specified.

91. In an interchange speed gear mechanism, the combination with the engine shaft and plurality of change gear operating shifters, of means adapted to be thrown in and out of connection with the engine shaft for operating any of the aforesaid shifters, and means for initially throwing the engine clutch out of connection, as and for the purpose specified.

92. In an interchange speed gear mechanism, the combination with the engine shaft, and plurality of change gear operating shifters, of means adapted to be thrown in and out of connection with the engine shaft for operating any of the aforesaid shifters, an independently operated shifter selecting device whereby the shifter desired is placed in operative connection with the engine shaft, and means for initially throwing the engine clutch out of engagement, as and for the purpose specified.

93. In an interchange speed gear mechanism, the combination with the engine shaft and plurality of change gear operating elements, of means adapted to be thrown in and out of connection with the engine shaft for operating any of the aforesaid elements, an independently operated element selecting device whereby the element desired is placed in operative connection with the engine shaft, and means for initially throwing the engine clutch out of engagement.

94. In an interchange speed gear mechanism, the combination with the engine shaft, and a plurality of change gear operating shifters, means adapted to be thrown in and out of connection with the engine shaft for operating any of the aforesaid shifters, an independently operated shifter selecting device whereby the shifter desired is placed in operative connection with the engine shaft, and means for initially throwing the engine clutch out of connection, and automatic means for again throwing the engine clutch into gradual engagement, as and for the purpose specified.

95. In a power driven vehicle, a plurality of speed changing gears, shifters for said gears, and means whereby the driving power is selectively transmitted to said shifters.

96. In an interchange speed gear mechanism, the combination with the engine shaft, and plurality of change gear operating shifters, means for selecting the shifters, and means adapted to be thrown in and out of connection with the engine shaft for operating the preselected shifter.

97. The combination with a prime mover and an element to be driven thereby, of an interposed variable speed mechanism, and means adapted to cause the prime mover to selectively connect the variable speed mechanism with the driven element.

98. In an interchange speed gear mechanism, the combination with a driving element and plurality of change speed gears, selective operating means, and means adapted to be thrown in and out of connection with the driving element for actuating the preselected operating means.

99. The combination with a prime mover and an element to be driven thereby, an interposed clutch and variable speed mechanism for connecting the prime mover with the driven element, and means adapted to actuate the clutch to disconnect the prime mover from the driven element and concurrently establish a selective operative connection between said prime mover and the variable speed mechanism.

100. In combination, a prime mover, a driven element, a plurality of transmission elements, adapted to selectively connect the prime mover with the driven element, shifters for the transmission elements, means adapted to establish a selective operative connection between the shifters and the transmission elements, and means adapted to disconnect the prime mover from the transmission elements and to connect it with the shifters.

101. In combination, a prime mover, a driven element, variable speed transmission elements, a clutch, shifters for the transmission elements, a shifter for the clutch, means for establishing selective operative connection between the transmission elements and the shifters, said clutch being normally adapted to connect the prime mover with the transmission elements, said clutch shifter being adapted to actuate the clutch to disconnect the prime mover from the transmission elements and concurrently therewith to connect the prime mover with the shifters of the transmission elements.

102. In a motor driven vehicle, power controlling means, variable speed change mechanism, operating devices therefor, a clutch normally adapted to connect the motor with the variable speed change mechanism, means to actuate the clutch to disconnect the motor from the speed change mechanism, means for connecting the power controlling means with said clutch, operating means to cause the clutch to disconnect the motor from the speed change mechanism, means for connecting the power controlling means to the variable speed change mechanism, operating devices to cause, firstly, the disconnecting of the variable speed change mechanism from the clutch, and secondly, to cause a new operative driving relation in connection with the clutch and means for causing the clutch to connect the motor with the variable speed change mechanism.

103. The combination in a power driven vehicle, of a power element, a plurality of transmission devices, shifters for said devices, means for indicating the transmission device to be shifted, and means for transmitting the power of the element to the shifters.

104. The combination of a prime mover, a driven element, a plurality of variable speed transmission elements, means for shifting the transmission elements, means for selecting a transmission element to be shifted into a position for connecting the prime mover with the driven element, and means adapted to disconnect the prime mover from the transmitting elements and to connect it with the shifting means to actuate said shifting means, first, to neutralize the transmitting elements and subsequently to shift the selected transmission element into an operative position.

In testimony whereof I have signed my name to this specification, in the presence of two subscribing witnesses, on this 26th day of February A. D. 1912.

EDWARD E. GRAY.

Witnesses:
ESMÉE WALTON,
KENT W. WONNELL.